United States Patent
Kang

(10) Patent No.: US 6,936,202 B2
(45) Date of Patent: *Aug. 30, 2005

(54) METHOD FOR MANUFACTURING MULTICOLOR SLIDE FASTENER, AND APPARATUS THEREFOR

(76) Inventor: Young-Chul Kang, 317-4 Jaeil-Ri, Yangji-Myun, Yongin-Si, Kyunggi-Do (KR)

(*) Notice: Subject to any disclaimer, the term of this patent is extended or adjusted under 35 U.S.C. 154(b) by 358 days.

This patent is subject to a terminal disclaimer.

(21) Appl. No.: 10/218,354

(22) Filed: Aug. 14, 2002

(65) Prior Publication Data

US 2003/0047832 A1 Mar. 13, 2003

(30) Foreign Application Priority Data

Sep. 7, 2001 (KR) .................................. 10-2001-0055118

(51) Int. Cl.⁷ .............................. D01D 5/20; B32B 1/00; B29C 39/12; B29C 70/68; B29D 5/00
(52) U.S. Cl. .................. 264/167; 264/171.13; 264/245; 264/252; 425/116; 425/120; 425/121; 425/129.1; 425/545; 425/557; 425/561; 425/572; 425/582
(58) Field of Search ............................ 264/167, 171.13, 264/245, 252; 425/121, 129.1, 545, 582, 116, 120, 557, 561, 572

(56) References Cited

U.S. PATENT DOCUMENTS 6,422,851 B2 * 7/2002 Kang ........................ 425/116

* cited by examiner

Primary Examiner—Stephen J. Lechert, Jr.
(74) Attorney, Agent, or Firm—Roth & Goldman, P.A.

(57) ABSTRACT

Apparatus for manufacturing a multicolor slide fastener includes an upper die 110, a lower die 120, and a plurality of unit fastening teeth-forming slots 101 formed in a lengthwise direction. Molding material-injecting passages and a plurality of sprue holes 102 are provided for injecting the molding materials S into the slots 101. Inclined passages 201 and 202 are connected to the molding material injecting passages respectively, for carrying the molding materials S from a raw material source. Heaters 240 and heat sensors 241 heat the passages 201 and 202. Pressing means 300 press the molding materials S into the inclined passages 201 and 202. Valves 400 control injection of the molding materials S into the sprue holes 102 of the upper die 110.

15 Claims, 18 Drawing Sheets

METHOD FOR MANUFACTURING MULTICOLOR SLIDE FASTENER, AND APPARATUS THEREFOR

FIELD OF THE INVENTION

The present invention relates to a method and an apparatus for manufacturing a multicolor slide fastener. Particularly, the present invention relates to a method and an apparatus for manufacturing a multicolor slide fastener, in which the present applicant's Korean Patent Application No. 2001-021368 (entitled "Apparatus for Manufacturing Multicolor Slide Fastener") is improved and complemented to make it possible to efficiently manufacture a high quality multicolor slide fastener, to simplify the carriage and valve mechanisms, and to decrease the driving load so as to extend the life expectancy of the apparatus.

BACKGROUND OF THE INVENTION

Generally, slide fasteners are widely used in garments and bags. The slide fasteners are constituted such that a plurality of unit meshing teeth are attached on a pair of supporting tapes in the lengthwise direction so as to be coupled or separated by a slider. Accordingly, the slide fasteners are used for opening or closing the products such as garments and bags.

In these slide fasteners, the supporting tapes are usually made of a fabric, and the unit meshing teeth and the slider are made of a synthetic resin or a metal. Further, the unit meshing teeth, the slider and the supporting tapes have a single pattern and a single color, and the pattern of them are significantly different from that of the garment, with the result that a pattern discontinuity is formed.

Accordingly, the slide fasteners cannot be harmonized with the garments, the bags and the personal articles, and therefore, the equilibrium is failed in the design. Therefore, diversified and colorful fashions cannot be realized, and the individuality is lost, while the design impression is damaged. Further, the liberty degree of the design is restricted.

In an attempt to solve the problems of the single color slide fasteners, UK Patent Application GB 2 177 967 A, Japanese Patent Publication No. Sho-61-293822 and Korean Patent Publication No. 1990-0001907 (all the same invention respectively filed to United Kingdom, Japan and Korea, which are to be called "cited invention" below) disclose a new method for manufacturing a slide fastener stringer.

In this method for manufacturing the slide fastener stringer, a stringer tape is involved, and there are also formed multi-color injection-molded element trains that are attached on the stringer tape in the longitudinal direction. This method includes the steps of: (a) injection-molding a plurality of longitudinally separated coupling element trains on a stringer tape in the longitudinal direction, the injection-molded coupling element trains having a first color and being separated from each other by non-element portions; (b) injection-molding a plurality of longitudinally separated coupling element trains on a stringer tape along the non-element portions, these newly injection-molded coupling element trains having a second color different from the first color of the previously injection-molded coupling element trains; and (c) repeatedly carrying out the step (b) until the non-element portions are filled with the injection-molded coupling elements.

In connection with the above described manufacturing method, an individual slide fastener, i.e., a commodity slide fastener which can be used in an adult garment or the like will be criticized.

For example, a slide fastener will be examined in which the total length is 500 mm, the pitch of the elements is 2 mm, and the number of the elements is 250.

At a first process, five elements are injection-molded with a certain color, then the injection-molded elements are cooled, and then the stringer tape is fed further. At a second process, another five elements are injection-molded with another color, then the injection-molded elements are cooled, and then the stringer tape is fed still further. These processes are repeated 50 times to manufactured one slide fastener.

Accordingly, there are serious problems in this method. That is, in order to manufacture one single slide fastener, the process of injection-molding, cooling and feeding has to be carried out 50 times. During the cooling, there are accompanied contractions and deformations, while during the feeding, the dislocation errors are increased. As a result, the pitch distance cannot be uniform between the element groups that have been injection-molded at different stages.

Thus in the above described method, in manufacturing a single slide fastener, the process of injection-molding, cooling and feeding has to be carried out several-score times repeatedly. Thus the thermal contractions and dislocations occur several-score times, and therefore, the pitches of the unit meshing teeth cannot be uniform.

Further, the gaps between the teeth over the different processes are not constant, and therefore, a practically useful fastener cannot be realized.

So, in order to solve the problem, the Applicant invented a "Multi Color Slide Fastener Manufacturing Apparatus" and filed it as a Korean Patent Application No. 2001-021368. The invention is constituted of a molding die consisting of upper and lower dies, a plurality of unit meshing teeth forming slots being formed in a longitudinal direction thereof, a plurality of molding material injecting passages being mutually isolatedly formed to inject the molding materials of different colors into respective groups of the meshing teeth forming slots and a plurality of sprue holes being formed for injecting the molding materials of different colors into the respective molding material injecting passages; a cylinder block coupled to a top of the molding die, and consisting of a plurality of vertical cylinders and a plurality of horizontal cylinders in a crossing form, a plurality of discharge holes being formed correspondingly with the sprue holes of the upper die to communicate to the horizontal cylinders; a heating means for heating the cylinder block; a plurality of carrying screws respectively inserted into the vertical cylinders to carry the molding materials of different colors; a driving means for driving the carrying screws; a plurality of pistons respectively inserted into the horizontal cylinders, for extruding the molding materials; another driving means for driving the piston; and an opening/closing means for intermittently opening-closing the respective discharge holes of the cylinder block to intermittently inject the molding materials of different colors.

According to the invention as described above, the multi-color slide fasteners can be continuously produced by injecting the molding materials of different colors into the meshing teeth forming slots of the molding die by one shot. That is, a plurality of groups of the meshing teeth are formed with different colors by one shot, so that the meshing teeth could form various patterns.

That is, one whole multi-color slide fastener can be manufactured by one shot, and therefore, the pitches and gaps between the unit meshing teeth are uniform. Accordingly, not only the multi-color slide fasteners can be mass-produced, but also their quality and reliability can be upgraded. Further, various patterns and colors can be formed on the slide fastener. Thus the multi-color slide fastener manufacturing apparatus is capable of manufacturing the multi-color slide fastener in a practical and satisfactory manner. Its production is not only fast but also its pitches are uniform, while the product defects are eliminated.

However, in the apparatus of the above mentioned prior art, there are the following problems. That is, screws and pistons are coupled to a plurality of vertical and horizontal cylinders which are disposed in directions crossing a cylinder block, thereby carrying the molding materials. Accordingly, the molding materials (synthetic resins) cannot be efficiently carried from the horizontal cylinders to the sprue holes of the molding die.

Further, gears are interlocked to a plurality of carrying screws, and therefore, when the plurality of the intermeshed gears revolve, there is formed a high load. Consequently, not only the gears cannot smoothly revolve, but also the life expectancies of the carrying screws are shortened.

Further, there are a plurality of cylinder blocks, and there is installed a valve in each of the plurality of the passages. Thus the constitution is complicated, and disorders are frequent. Further, if the apparatus is used for a long time, the valves are subjected to malfunctions, and therefore, the final products become irregular, thereby losing the product reliability.

SUMMARY OF THE INVENTION

The present invention is intended to overcome the above described disadvantages of the prior art.

Therefore it is an object of the present invention to provide a method and an apparatus for manufacturing a multicolor slide fastener, in which the molding materials of two or more colors are meltingly press-carried through V-shapedly-arranged two groups of inclined passages to ultimately inject the molding materials of two or more colors through opening/closing means of the respective inclined passages into the unit fastening teeth forming slots, thereby efficiently manufacturing a high quality multicolor slide fastener, simplifying the valve and carrying means, and decreasing the driving load so as to extend the life expectancy of the apparatus.

In achieving the above object, the method for manufacturing a multicolor slide fastener according to the present invention includes the steps of: loading a pair of supporting tapes on a molding die, the molding die having a plurality of mutually isolated unit fastening teeth-forming slots, and each of the molding materials being injected into each of groups of the unit fastening teeth-forming slots (supporting tape loading step); thermally melting and carrying the molding materials from a raw material source part through inclined passages of both sides, each of the inclined passages being connected to each of injection passages of the molding die (heating and melting step); opening/closing an opening/closing means, the opening/closing means being disposed between discharge ends of the inclined passages and nozzles (passage opening/closing step); injecting each of the molding materials of two or more colors through each of the nozzles and injecting passages into each of groups of unit fastening teeth-forming slots after melt-passing the molding materials through the passage-opening/closing means (injecting step); and cooling the unit fastening teeth formed on the supporting tapes and taking out the product (taking-out step).

In another aspect of the present invention, the apparatus for manufacturing a multicolor slide fastener by injecting molding materials into a molding die according to the present invention includes the molding die consisting of an upper die and a lower die, with a plurality of unit fastening teeth-forming slots being formed on the molding die in a lengthwise direction, with a plurality of molding material injecting passages being mutually isolatedly formed for respective groups of the unit fastening teeth-forming slots, and a plurality of sprue holes being formed for injecting the molding materials into the respective groups of the unit fastening teeth-forming slots; a plurality of inclined passages connected to the molding material injecting passages respectively, for carrying the molding materials from a raw material source part; a passage element having a plurality of nozzles connected to respective discharge holes of the inclined passages and to the injecting passages of the molding die; a plurality of pressing means such as pistons or carrying screws for press-carrying the molding materials to the inclined passages; and an opening/closing means installed between the lower discharge holes and the nozzles, for opening/closing the injection of the molding materials into the sprue holes of the upper die.

The passage elements include: a plurality of nozzles formed on a lower port ion of a cylinder block and connected the sprue holes of the upper die respectively; and two groups of the inclined passages formed above the nozzles in as many as the nozzles and in two rows. Near each of the upper ends of the inclined passages, there is formed a raw material feeding hole, for supplying the molding materials, and the two groups of the inclined passages form a V shaped contour.

As to the passage elements, the inclined passages of the both sides form a Y shaped contour together with the nozzles.

The passage elements should be preferably formed in the cylinder block. However, alternatively, a plurality of pipes may be disposed in a zigzag form so as to form a V shaped contour, thereby forming the inclined passages. Each of the pipes is connected to each of the tops of cylindrical tubes, and the nozzles are connected to the bottoms of the cylindrical tubes, while nozzle-opening/closing rods are inserted into the cylindrical tubes.

In this case, a hopper is formed on each of the upper end of the inclined pipes, and a heater is coupled to the circumference of each of the inclined pipes. Further, a rectangular plate is welded to a side of each of the cylindrical tube groups, and the rectangular plate is lifted by a power driving device.

Further, alternatively, instead of attaching the rectangular plate to the cylindrical tubes, the rectangular plate is provided with round holes or slots, so that the nozzle-opening/closing rods can be inserted into the holes.

The passage opening/closing means is constituted such as that: an opening/closing rod insert ion hole is formed for making the nozzles and the inclined passages communicate to each other within the cylinder block; an integral nozzle opening/closing rod has a plurality of both-side inlet holes and a plurality of lower discharge holes correspondingly to the nozzles and the discharge holes of the inclined passages, for making the both-side inlet holes alternately communicate to the discharge hole, the integral nozzle opening/closing rod being inserted into the opening/closing rod insertion hole; and the integral nozzle opening/closing rod is actuated by a known means.

Further, the passage opening/closing means is constituted such that: an actuation space part is formed in the cylinder block and communicates to the discharge hole of the inclined passage and to the nozzles; an integrally formed valve unit is inserted into the space part, the valve unit being provided with a plurality of both-side inlet holes and a plurality of lower discharge holes, and the both-side inlet holes alternately communicating to the lower discharge hole respectively; a pair of guide pins secured to fastening holes of the valve unit is slidably coupled to guide holes of the cylinder block respectively; and a spring is coupled to a middle portion of each of the guide pin to elastically press down the integrally formed valve unit, whereby the integrally formed valve unit is opened and closed in accordance with the vertical motions of the cylinder block.

The cylinder block includes: one group of inclined passages at one side; and another group of inclined passages at another side, the passages being arranged alternately in a zigzag form.

BRIEF DESCRIPTION OF THE DRAWINGS

The above object and other advantages of the present invention will become more apparent by describing in detail the preferred embodiments of the present invention with reference to the attached drawings in which:

FIGS. 1 to 8 illustrate a preferred embodiment of the multicolor slide fastener manufacturing apparatus according to the present invention, in which:

FIG. 1 is a perspective view of the multicolor slide fastener manufacturing apparatus;

FIG. 2 is a partial exploded perspective view of the multicolor slide fastener manufacturing apparatus;

FIGS. 3 and 4 are longitudinal sectional views showing the constitution of the multicolor slide fastener manufacturing apparatus after viewed in the direction of the width;

FIGS. 5 and 6 are longitudinal sectional views showing the constitution of the multicolor slide fastener manufacturing apparatus viewed in the lengthwise direction;

FIGS. 9 to 13 illustrate another embodiment of the multicolor slide fastener manufacturing apparatus according to the present invention, in which:

FIG. 9 is a perspective view of the multicolor slide fastener manufacturing apparatus;

FIG. 10 is a partial exploded perspective view of the multicolor slide fastener manufacturing apparatus;

FIG. 11 is a longitudinal sectional view showing the constitution of the multicolor slide fastener manufacturing apparatus viewed in the direction of the width;

FIG. 12 is a longitudinal sectional view showing the constitution of the multicolor slide fastener manufacturing apparatus after viewed in the lengthwise direction; and FIG. 13 is a partially cut-out perspective view of the integral valve unit.

DETAILED DESCRIPTION OF THE PREFERRED EMBODIMENTS

The present invention will be described in detail referring to the attached drawings.

Figure 1:
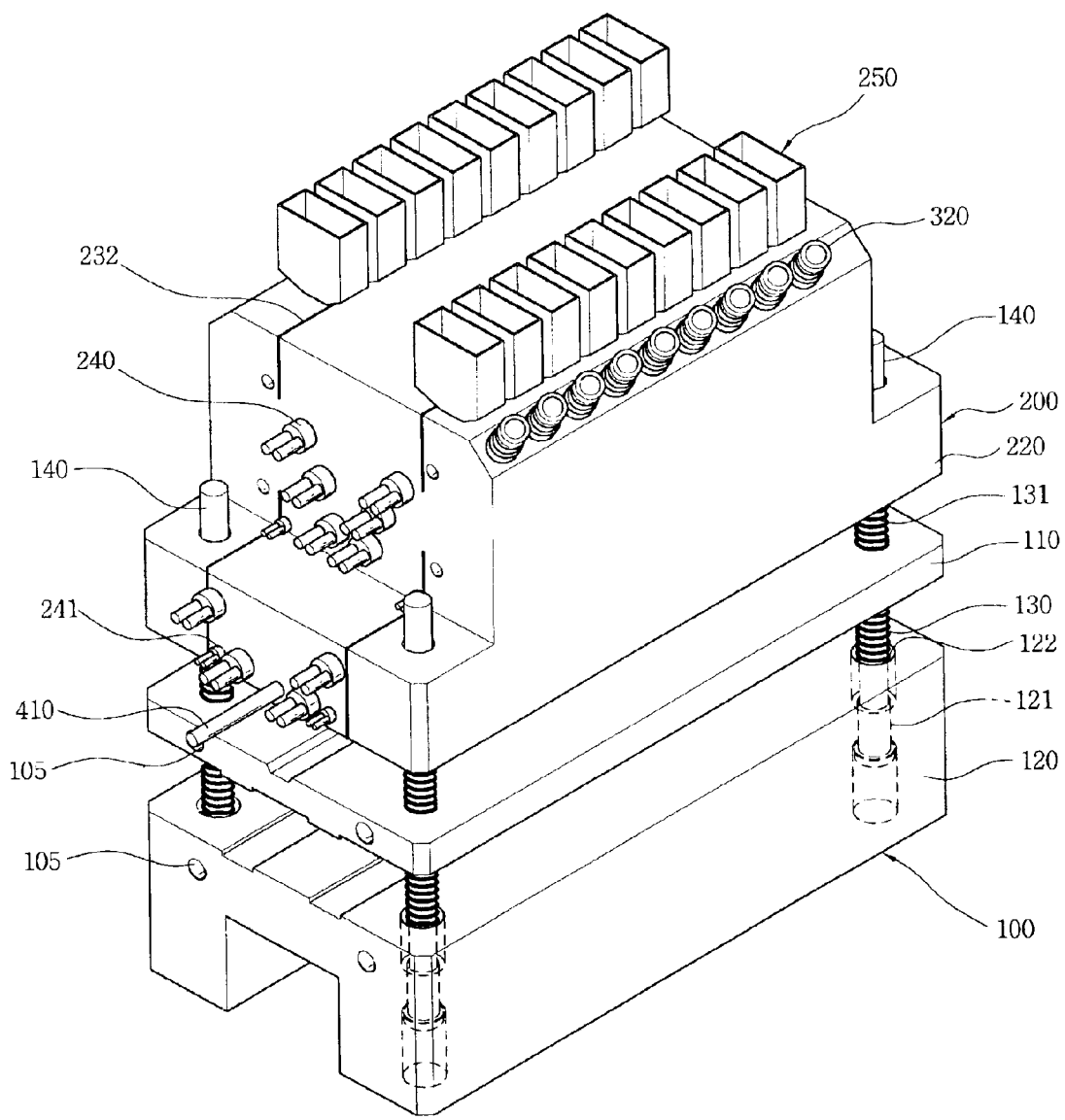
Figure 2A:
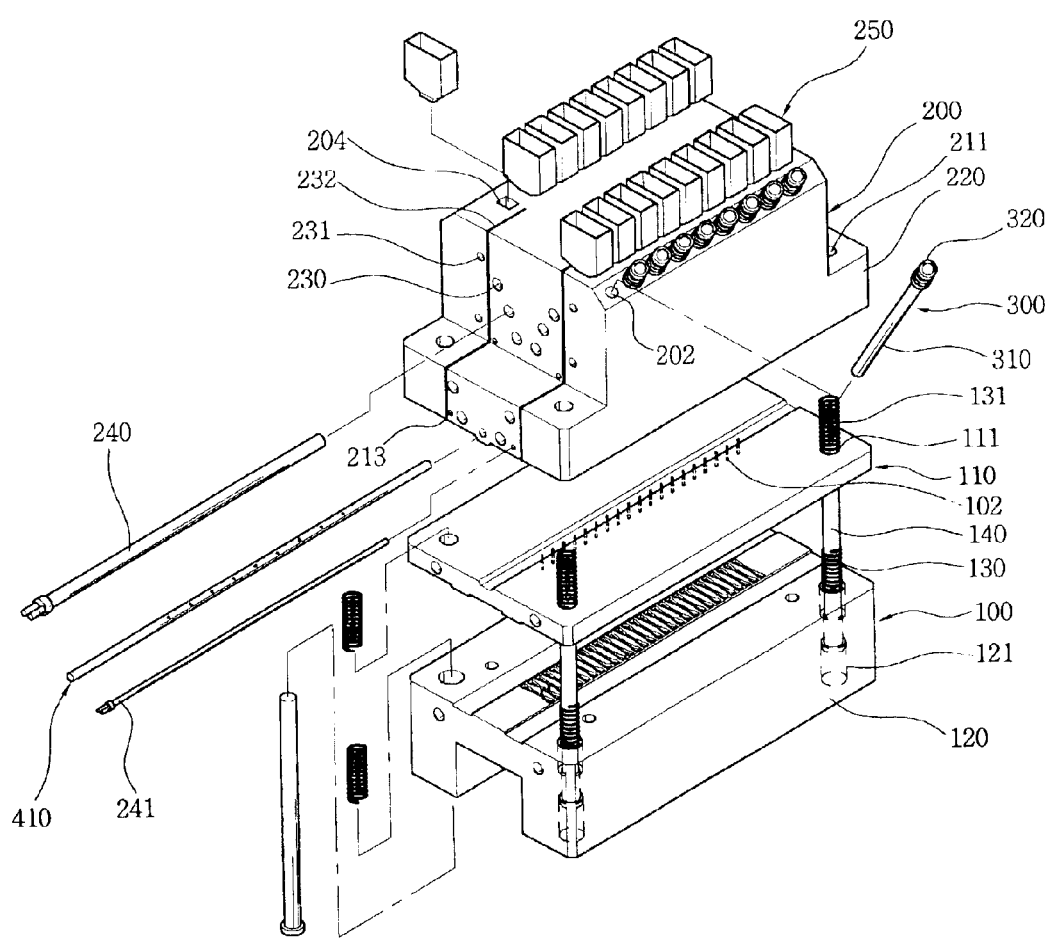
Figure 2B:
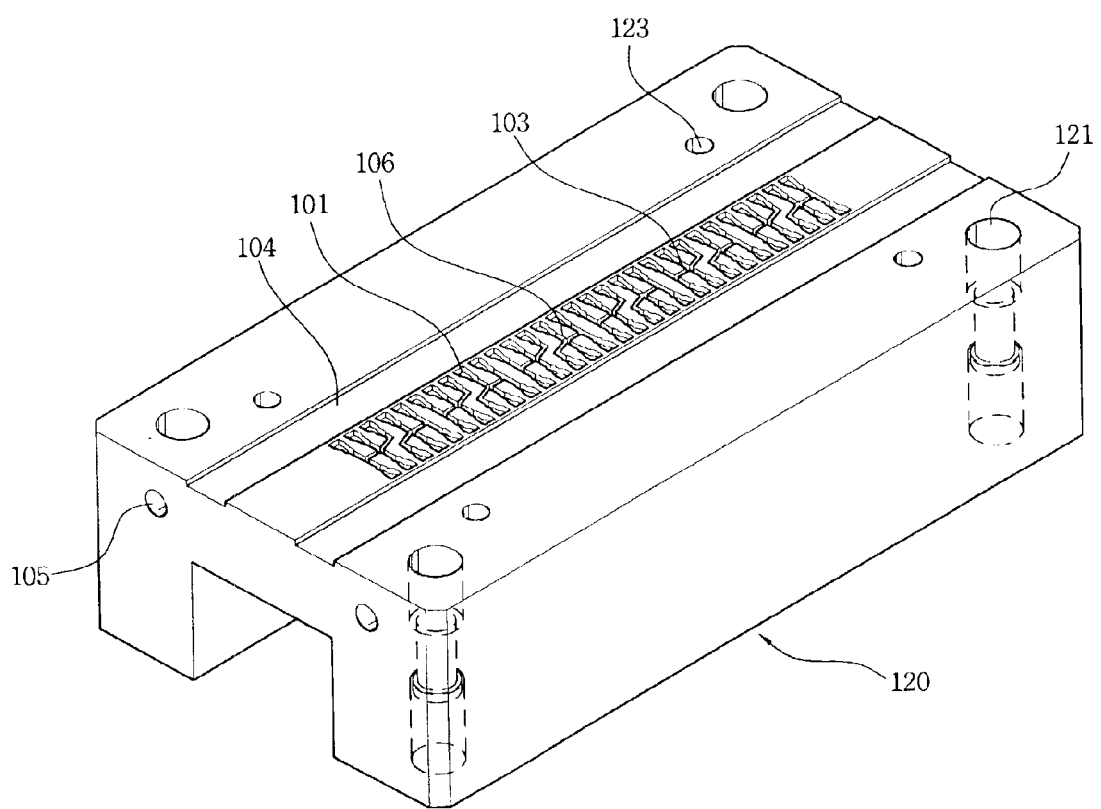
Figure 3:
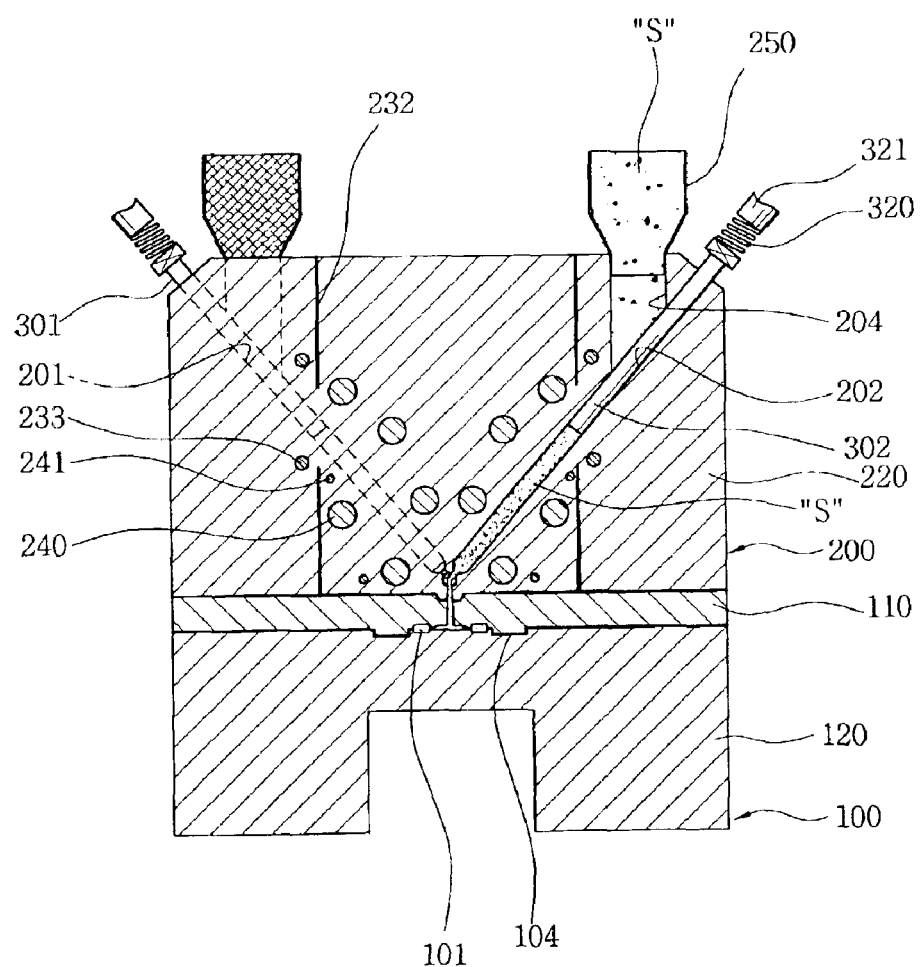
Figure 4:
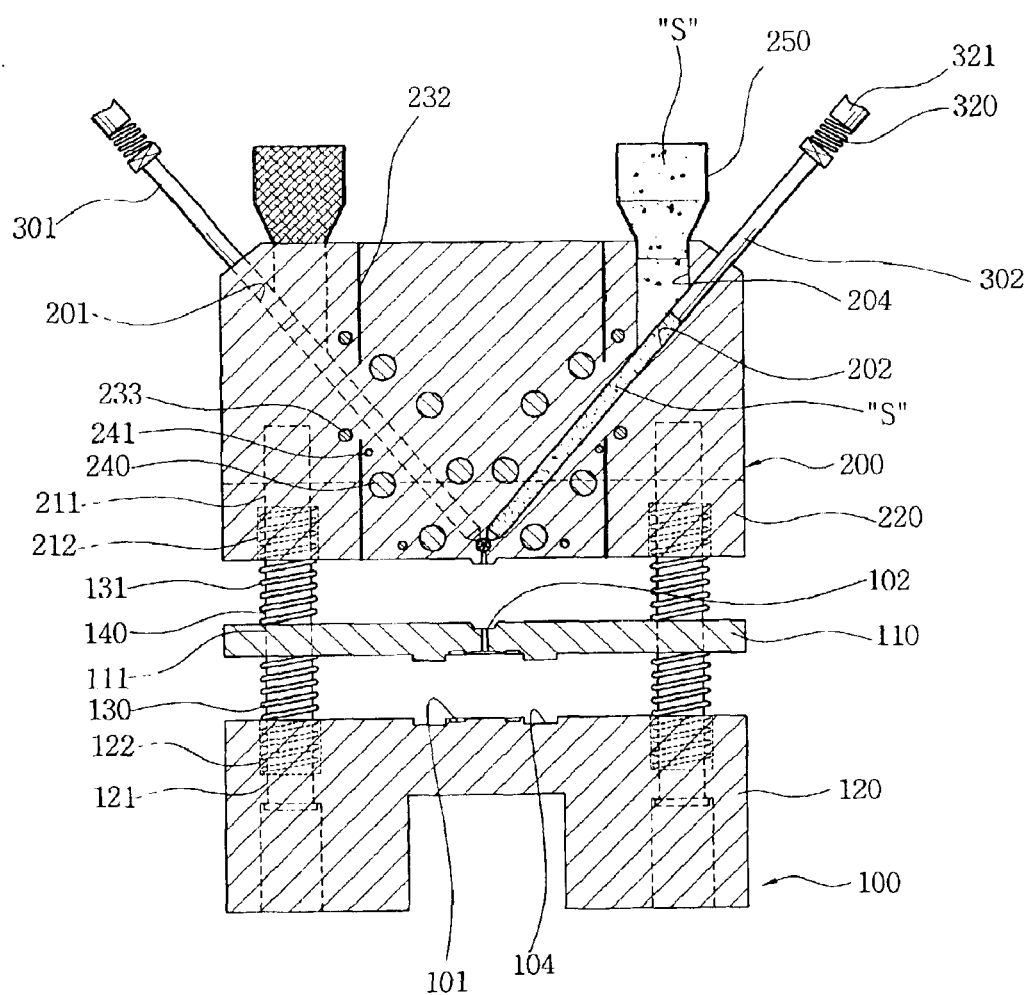
Figure 5:
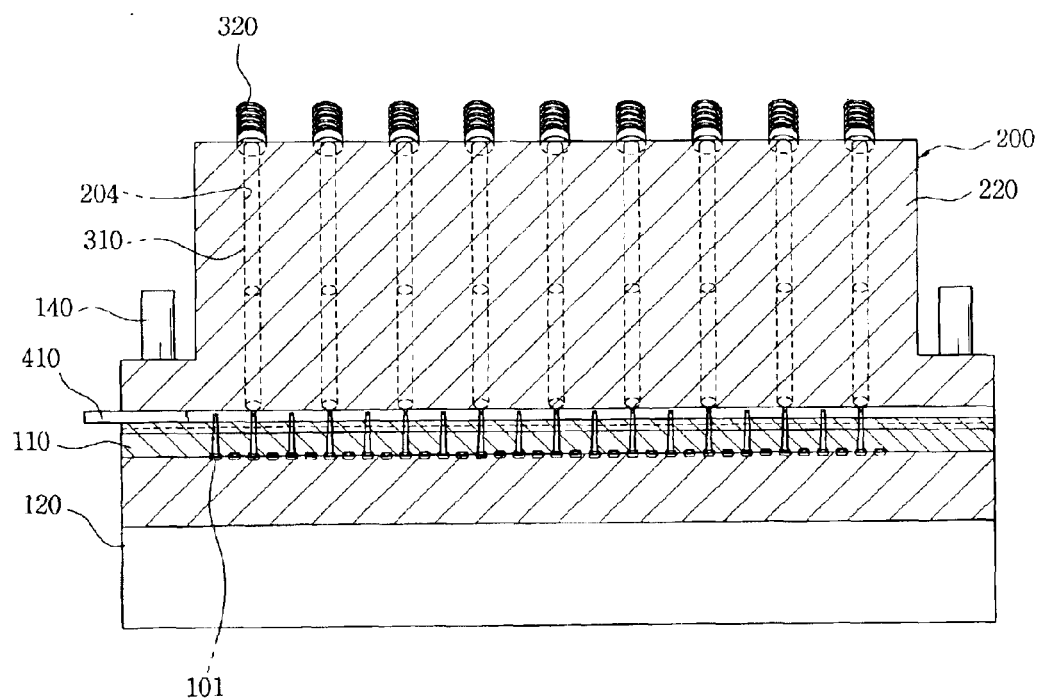
Figure 6:
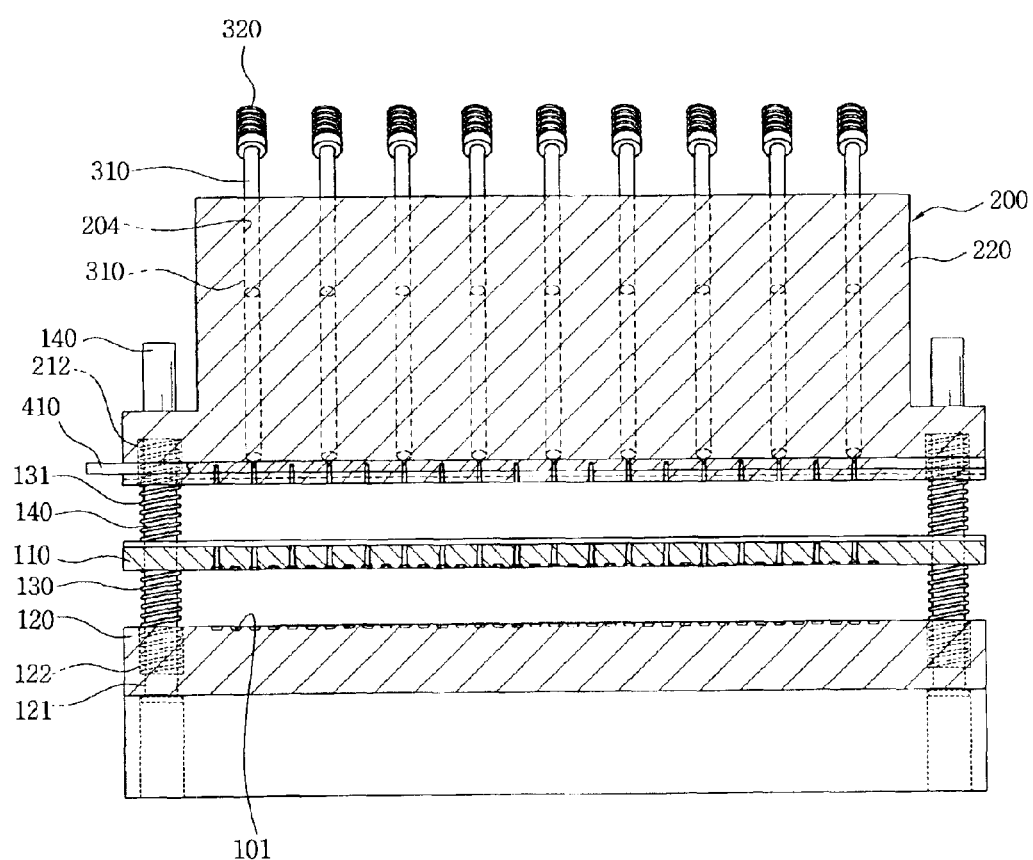

FIGS. 1 to 8 illustrate a preferred embodiment of the multicolor slide fastener manufacturing apparatus according to the present invention. That is, FIG. 1 is a perspective view of the multicolor slide fastener manufacturing apparatus. FIG. 2 is a partial exploded perspective view of the multicolor slide fastener manufacturing apparatus. FIGS. 3 and 4 are longitudinal sectional views showing the constitution of the multicolor slide fastener manufacturing apparatus viewed in the direction of the width. FIGS. 5 and 6 are longitudinal sectional views showing the constitution of the multicolor slide fastener manufacturing apparatus viewed in the lengthwise direction. FIGS. 7a and 7b are longitudinal sectional views showing the constitution and action of the passage opening/closing means. FIGS. 8a, 8b and 8c are plan, bottom and longitudinal sectional views of the integral nozzle opening/closing rod respectively.

First, referring to FIGS. 1 to 6, a first embodiment of the apparatus for manufacturing a multicolor slide fastener according to the present invention includes: a molding die 100 consisting of upper and lower dies 110 and 120; and a cylinder block 220 liftably installed above the upper die 110.

Figure 14:
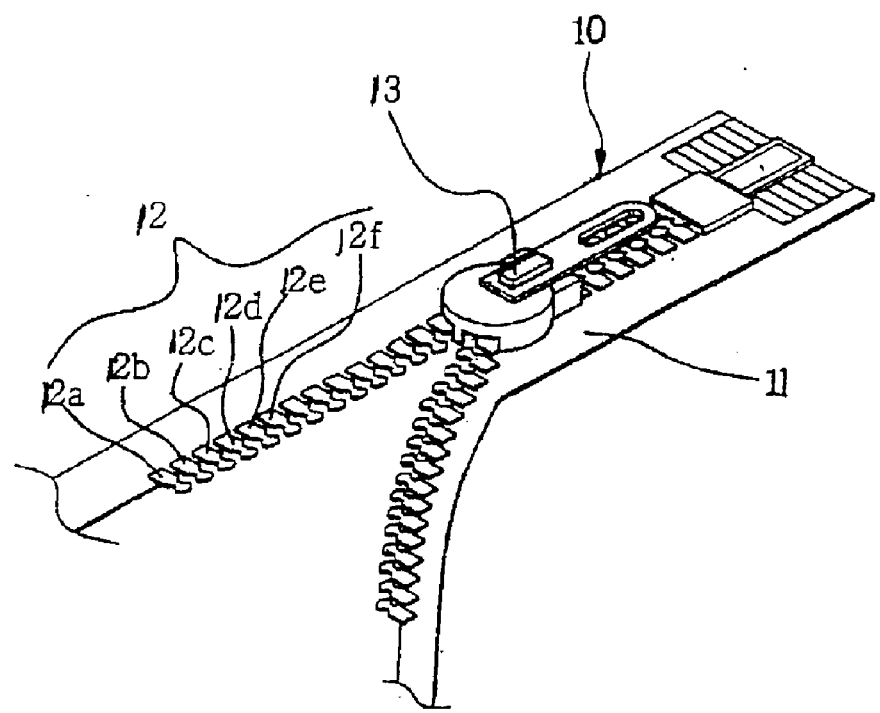
FIGS. 14 and 15 are respectively perspective and plan views of a multicolor slide fastener which is manufactured with the apparatus according to the present invention.
Figure 15:
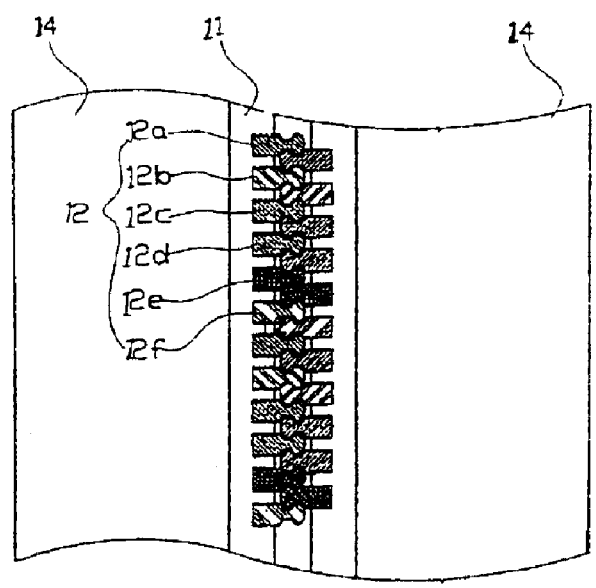

FIGS. 14 and 15 are respectively perspective and plan views of the multicolor slide fastener which is manufactured with the apparatus according to the present invention. Referring to FIGS. 14 and 15, The multicolor slide fastener 10 which is manufactured according to the present invention is constituted such that a plurality of unit fastening teeth 12 with two or more colors are formed on the inner edges of a pair of supporting tapes 11 at regular intervals; and a slider 13 is coupled to the two rows of the 12 of the supporting tapes 11.

The unit fastening teeth 12 of the slide fastener 10 are grouped into a plurality of sets, each set including one or more of the unit fastening teeth 12. Accordingly, a multicolor slide fastener can be manufactured, and depending on needs, a desired pattern can be formed on the slide fastener by properly combining the colors.

Referring to FIGS. 1 to 6 again, at the four corners of the upper and lower dies 110 and 120 and the cylinder block 220, there are formed guide holes 111, 121 and 211, the guide holes being aligned through the two dies and the cylinder block. On the upper portions of the guide holes 121 of the upper die 120, and on the lower portions of the guide holes 211 of the cylinder block 220, there are formed insertion tapered portions 122 and 212 respectively.

Into the guide holes 111, 121 and 211 of the upper and lower dies 110 and 120 and the cylinder block 220, the guide pins are inserted in the following manner. That is, the guide pins 140 are inserted from the bottom of the lower die 120. A spring 130 is coupled on each of the guide pins 140 between the upper and lower dies 110 and 120. Further, a spring 131 is installed on each of the guide pins 140 between the upper die 110 and the cylinder block 220. Accordingly, with an external force not imposed, the upper and lower dies 110 and 120 and the cylinder block 220 are spread away from each other.

The lower die 120 of the molding die 100 is secured to a base which supports a supporting structure (not illustrated), and the cylinder block 220 is coupled to a movable plate (not illustrated).

In the molding die 100, there are formed a plurality of unit fastening teeth-forming slots 101 in the lengthwise direction, and the unit fastening teeth-forming slots 101 are grouped into a plurality of sets, each set containing one or more slots 101, so that the molding materials S of different colors can be injected into the respective sets of the slots 101. For this purpose, the injecting passages are formed isolatedly from each other, and for this purpose, connecting slots 103 are formed, while sprue holes 102 are also formed.

The cylinder block 220 includes: a plurality of nozzles 203 communicating to the sprue hole 102 of the upper die 110; a plurality of inclined passages 201 for carrying the molding materials S; a plurality of inclined passages 202 disposed at the opposite side of the inclined passages 201 in a V shaped contour, for also carrying the molding materials, the inclined passages 201 and 202 being provided as many as the nozzles 203; a plurality of raw material inlet holes 204 for supplying the molding materials S into the inclined passages 201 and 202; and a plurality of hoppers 250 secured to the raw material inlet holes 204 respectively.

A pressing element 300 is installed within each of the inclined passages 201 and 202, for press-carrying the molding materials S. This pressing element 300 consists of a piston 310 or a carrying screw, and in this case, a spring 320 is coupled to the head portion of the piston 310, so that the pressing can be uniformly carried out with a pressing plate.

Figure 7A:
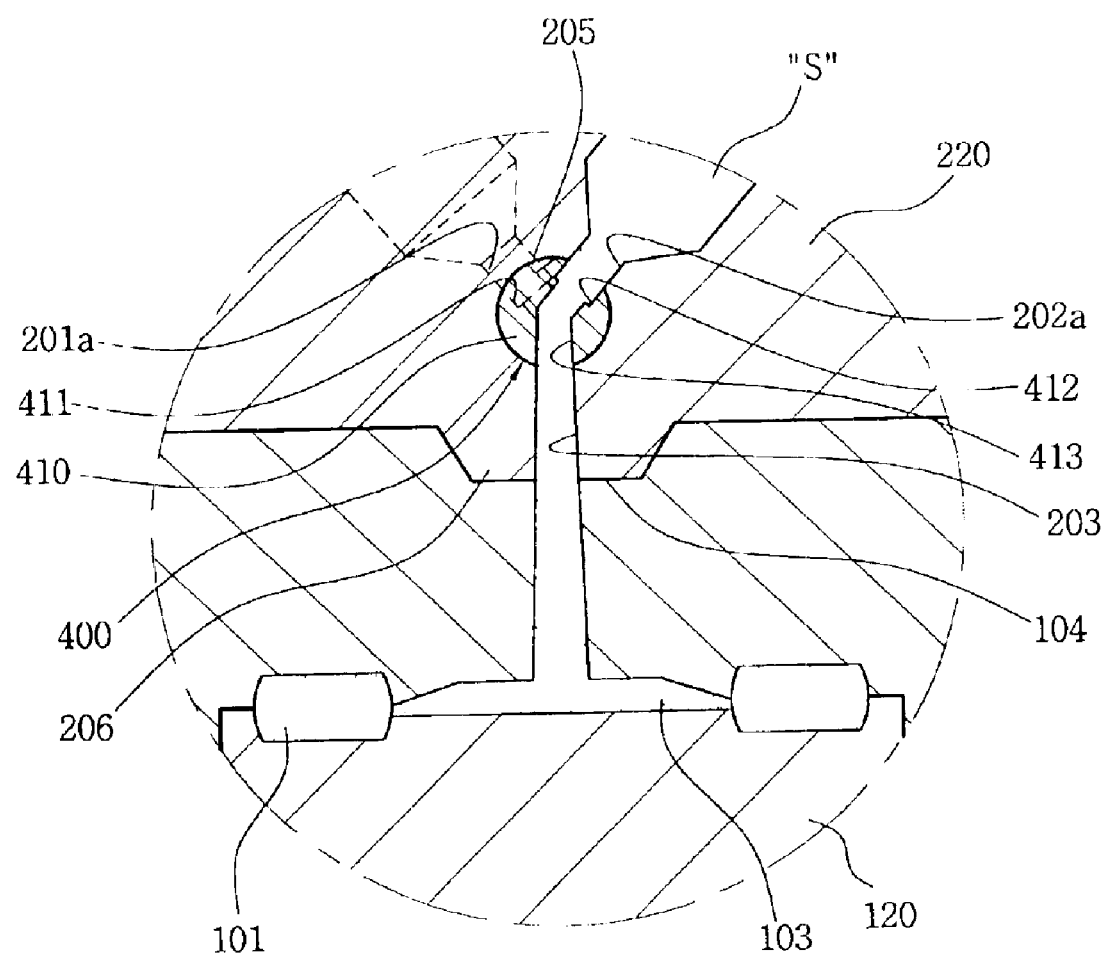
FIGS. 7a and 7b are longitudinal sectional views showing the constitution and action of the passage opening/closing means.
Figure 7B:
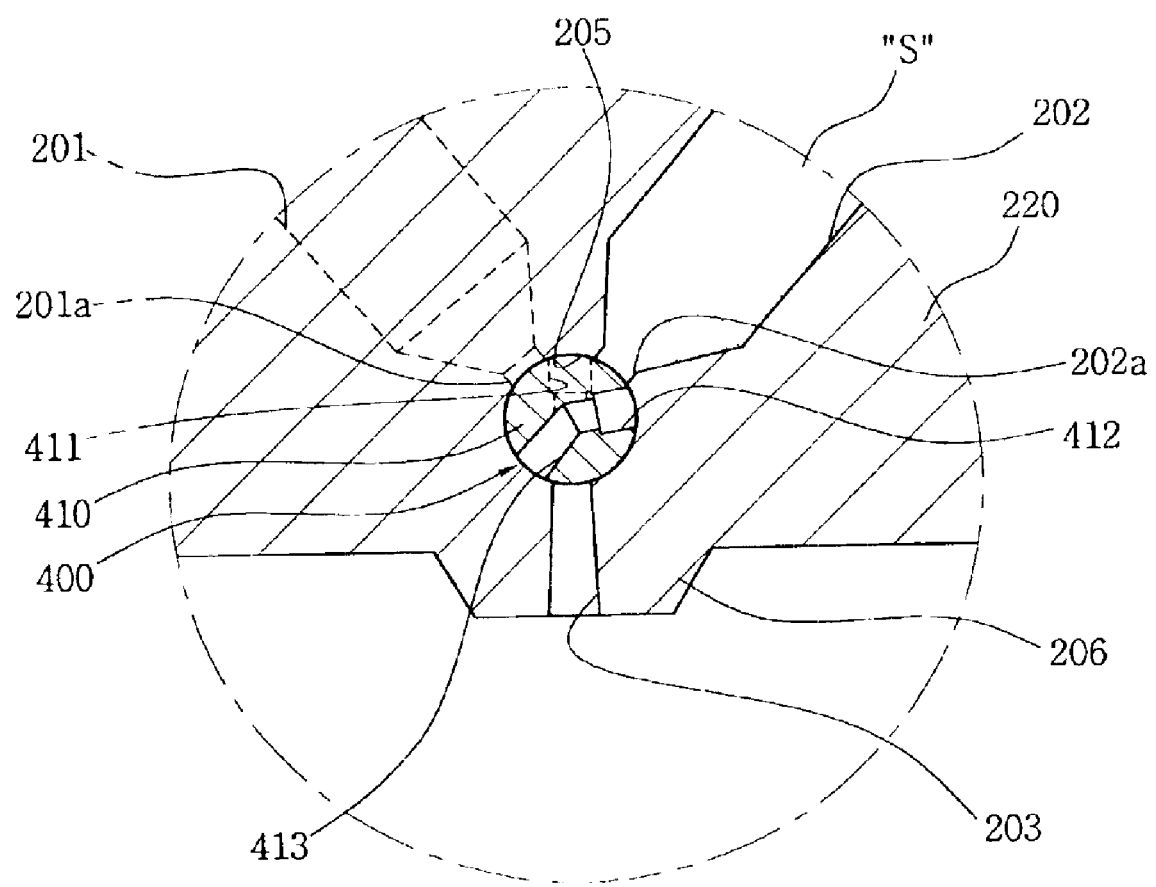

Referring to FIGS. 7a and 7b, the inclined passages 201 and 202 of the cylinder block 220 respectively have lower discharge holes 201a and 202a. A passage opening/closing means 400 is installed so that the supplying of the molding materials S (of different colors) into each of the sprue holes 102 can be allowed or blocked.

The passage opening/closing means 400 includes: an opening/closing rod insert ion hole 205 formed in the cylinder block 220 and communicating to the discharge holes 201a and 202a of the inclined passage 201 and 202; and an integral nozzle opening/closing rod 410 inserted into the opening/closing rod insertion hole 205, whereby the opening/closing is realized in the known actuation manner.

Figure 8A:
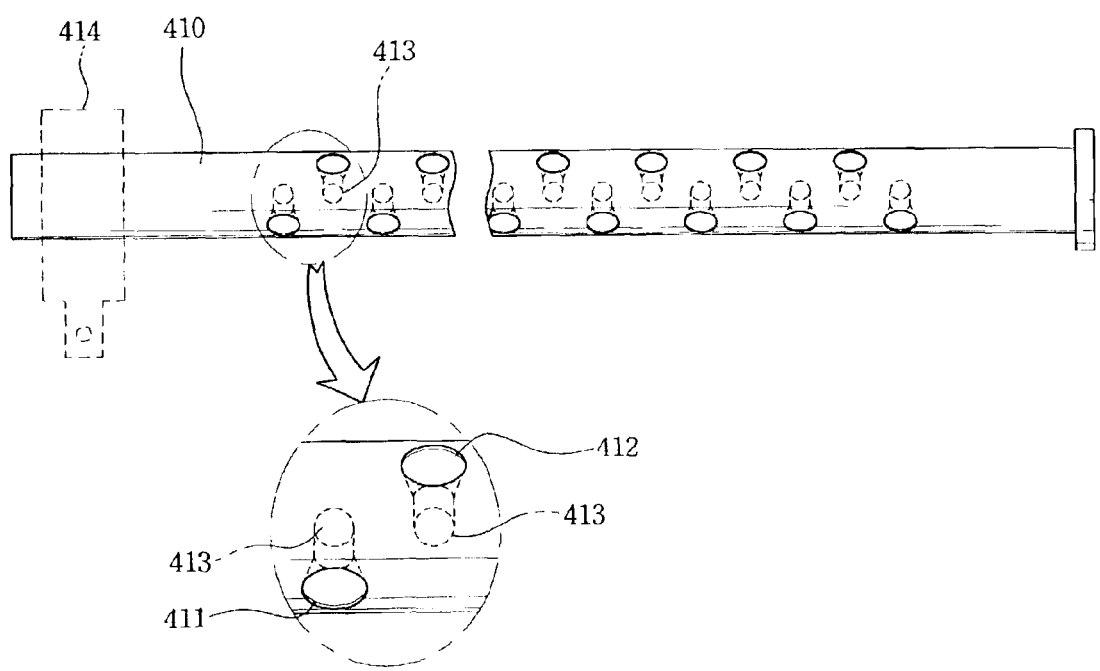
FIGS. 8a, 8b and 8c are plan, bottom and longitudinal sectional views of the integral nozzle-opening/closing rod respectively.
Figure 8B:
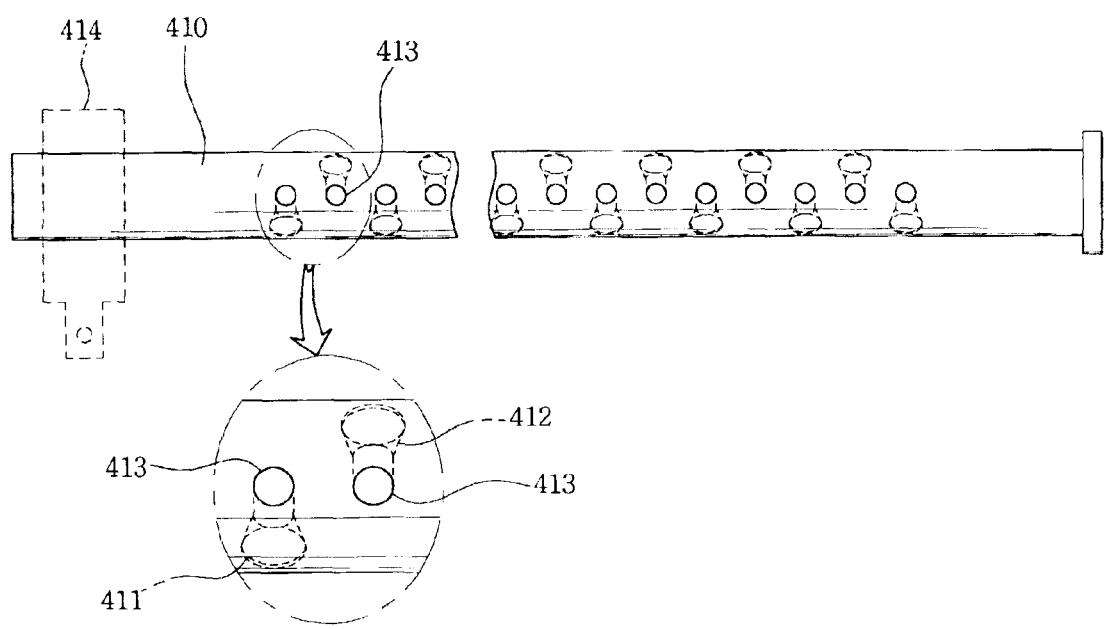
Figure 8C:
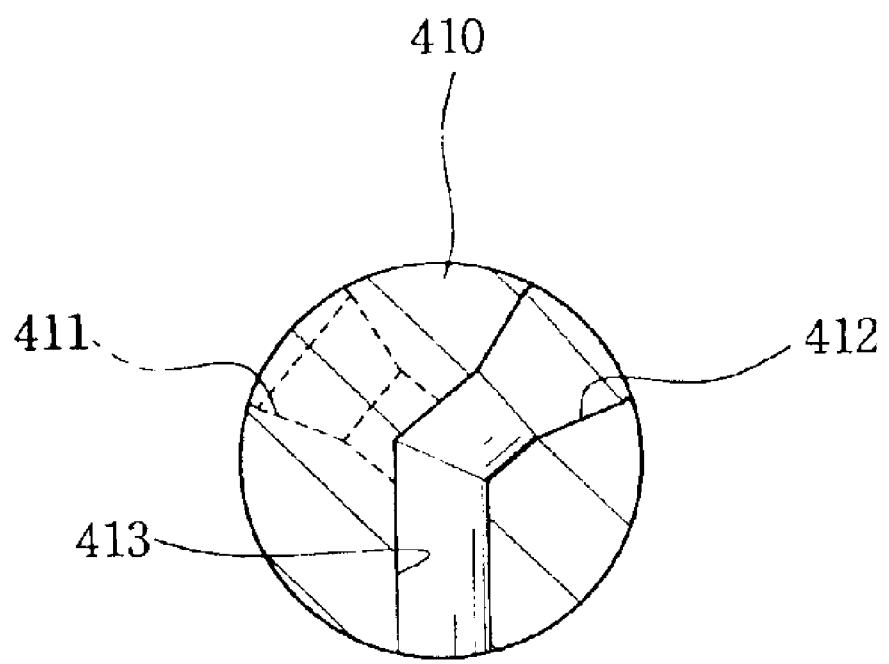

Referring to FIGS. 8a to 8c, the nozzle opening/closing rod 410 includes: a plurality of both-side inlet holes 411 and 412 and a plurality of lower discharge holes 413 in correspondence to the nozzles 203 and the lower discharge holes 201a and 202a of the inclined passages 201 and 202.

The both-side inlet holes 411 and 412 of the nozzle opening/closing rod 410 are arranged in a zigzag form alternately. Further, in the nozzle opening/closing rod 410, each of the discharge holes 413 is connected to each of the inlet holes 411 and 412 in a 1:1 form at a time.

In achieving the opening/closing purpose, the nozzle opening/closing rod 410 can be angularly rotated clockwise or anticlockwise or linearly moved back and forth. For this purpose, an actuation means is required.

Further, in the cylinder block 220, there are formed a plurality of heater insertion holes 230 respectively around the inclined passages 201 and 202. Also there are formed a plurality of sensor insertion holes 231, so that a plurality of heaters 240 for heating the molding materials S can be inserted into the heater insertion holes 230 respectively. Further, a plurality of thermal sensors 241 are inserted into the sensor insertion holes 231 respectively.

Further, at a side of the raw material feeding holes 204 of the cylinder block 220, there are formed heat-insulating slits 232 for preventing the dissipation of heat, and there are also formed cooling water passages 233 for carrying out a cooling by circulating a cooling water. Further, cooling water passages 105 are formed also in the upper and lower dies 110 and 120.

At the center of the bottom of the cylinder block 220, there is formed an elongate projection 206, along the middle line of which the nozzles 203 are formed. At the center of the top of the upper die 110, there is formed an elongate recess to receive the projection 206 when the molding die 100 is coupled.

The structures of the above described heating means, heat insulating means and cooling means can be freely modified depending on needs.

In another aspect of the present invention, the method for manufacturing a multicolor slide fastener 10 according to the present invention includes the steps of: loading a pair of supporting tapes 11 on a molding die 100, the molding die 100 having a plurality of mutually isolated unit fastening teeth-forming slots 101, and each of the molding materials S being injected into each of groups of the unit fastening teeth-forming slots 101 (supporting tape loading step); thermally melting and carrying the molding materials S of different colors from a raw material source part through the inclined passages 201 and 202 of both sides, each of the inclined passages 201 and 202 being connected to each of injection passages of the molding die 100 (heating and melting step); opening/closing an opening/closing means 400, the opening/closing means being disposed between discharge ends of the inclined passages 201 and 202 and nozzles 203 (passage opening/closing step); injecting each of the molding materials of two or more colors through each of the nozzles 203 and injecting passages into each of groups of unit fastening teeth-forming slots 101 after melt-passing the molding materials through the passage-opening/closing means 400 (injecting step); and cooling the unit fastening teeth 12 formed on the supporting tapes 11 and taking out the product (cooling and taking-out step).

Now the present invention will be described as to its action.

As shown in FIGS. 1. 4 and 6, if the molding materials S of various colors are supplied into the raw material feeding holes 204 of the two sets of the inclined passages 201 and 202 through hoppers 250 in a state with the molding 100 open, then the molding materials S pass through the inclined passages 201 and 202, and at the same time, the fed molding materials S are heated to a proper temperature by the surrounding heaters during the passing.

Thus the molding materials S of various colors, which have been melted within the inclined passages 201 and 202, are carried downward. Under this condition, the lower discharge holes 201a and 202a are closed by the passage opening/closing means 400 as shown in FIG. 7, and therefore, the melted molding materials S become stationary after being filled down to the lower discharge holes 201a and 202a of the inclined passages 201 and 202.

Thus with the molding die 100 open as shown in FIGS. 1, 4 and 6, a pair of supporting tapes 11 are inserted into the tape insertion slots 104 of the lower die 120 of the molding die 100, and then, a movable plate (not illustrated) is moved down to lower the cylinder block 220. If this is done, then the upper die 110 is pushed down by the springs 130 to be closely contacted to the lower die 120, with the result that the molding die 100 is closed up as shown in FIGS. 3 and 5.

Accordingly, the pair of the supporting tapes are bitten in the tape insertion slots 104 of the upper and lower dies 110 and 120.

Then the nozzle opening/closing rod 410, which has been inserted into the opening/closing rod insertion hole 205 of the cylinder block 220, is rotated by a certain angular degree by using a known reciprocating actuation means from the state of FIG. 7b to the state of FIG. 7a. If this is done, the inclined passage 201 and 202 communicate to the nozzles 203 each to each, and therefore, the molding materials S of various colors are carried by the pressures of the pistons 310 to be ultimately injected through the sprue holes 102 and the connecting slots 103 into the unit fastening teeth-forming slots 101.

Under this condition, the molding materials S of different colors are supplied into the inclined passages 201 and 202 in accordance with the designed pattern, and therefore, the unit fastening teeth 12 are formed by one-shot injection molding to show a predetermined pattern.

Further, the heaters 240 not only make the molding materials S of different colors liquid or gel, but also keep their temperature constant, so that the melted molding materials S of different colors can smoothly flow through the inclined passages 201 and 202 to be ultimately filled into the unit fastening teeth-forming slots 101.

Thereafter, the molding materials S of different colors, which have been filled into the unit fastening teeth-forming slots 101, are cooled, the unit fastening teeth 12 being formed on the pair of the supporting tapes. Then if the downward pressing force is removed from the cylinder block 220, then the cylinder block 220 is lifted again, with the result that the cylinder block 220, the upper die 110 and the lower die 120 are separated from each other as shown in FIGS. 1, 4 and 6.

The pair of the supporting tapes 11 on which a plurality of the unit fastening teeth 12 have been formed are taken out of the molding die 100, and then, the sprues, the runner forming parts and the gate sticks, which have been adhering on the unit fastening teeth 12, are removed. Then as shown in FIG. 14, the sliders 13 are coupled together, and thus, there is completed the manufacture of the slide fastener 10 on which the unit fastening teeth 12 of different colors form a predetermined design or pattern.

Further, the above operations can be repeated so as to produce a long length roll of the product.

As shown in FIGS. 14 and 15, the slide fastener 10, which is manufactured according to the present invention, includes the unit fastening teeth 12 (12a, 12b, 12c, 12d, 12e and 12f) of diversified colors, the teeth 12 biting the pair of the supporting tapes 11. The slide fastener 10 is not limited to that illustrated in the drawings, but can have various colors (at least two or more colors).

Figure 9:
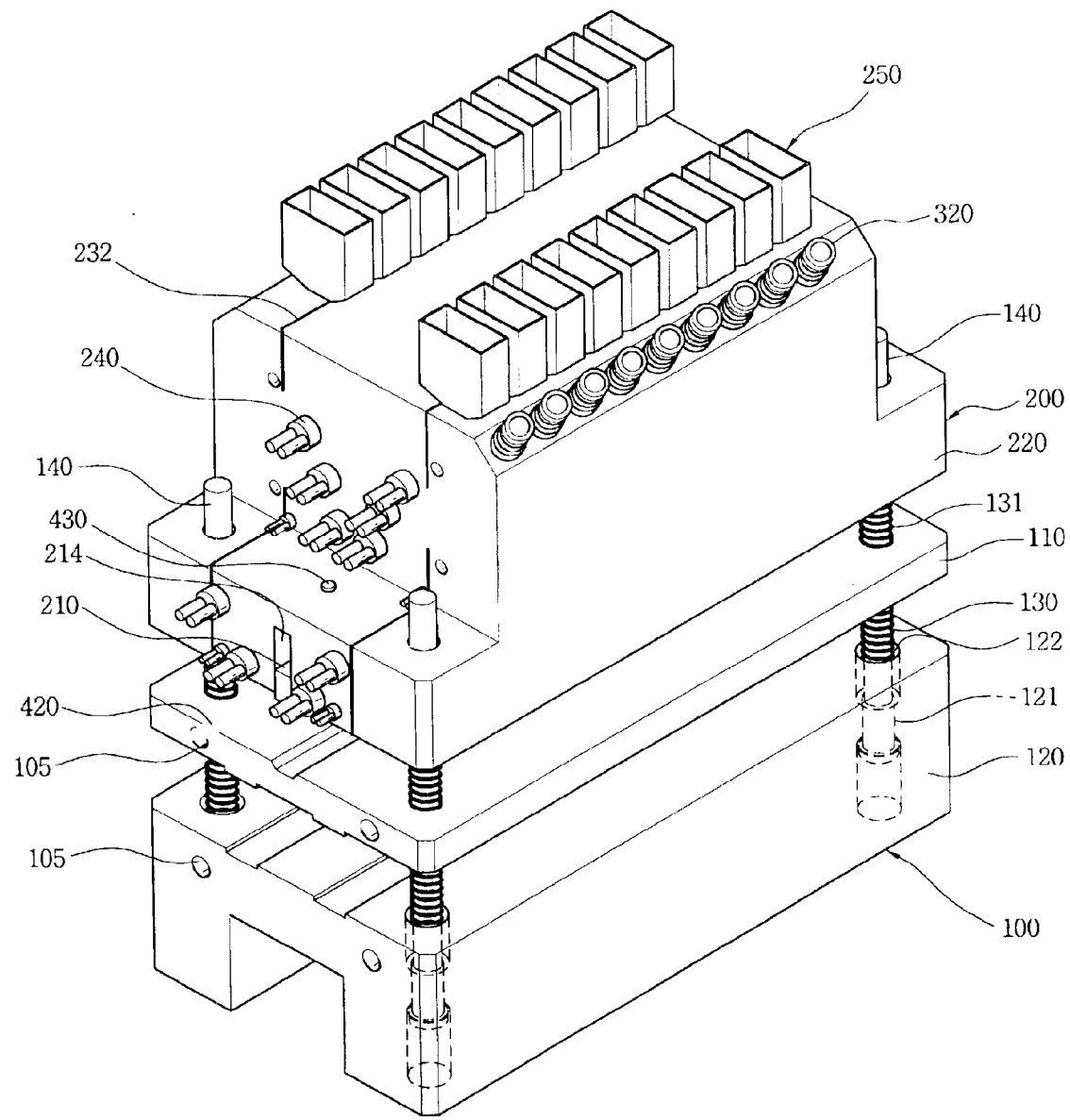
Figure 10:
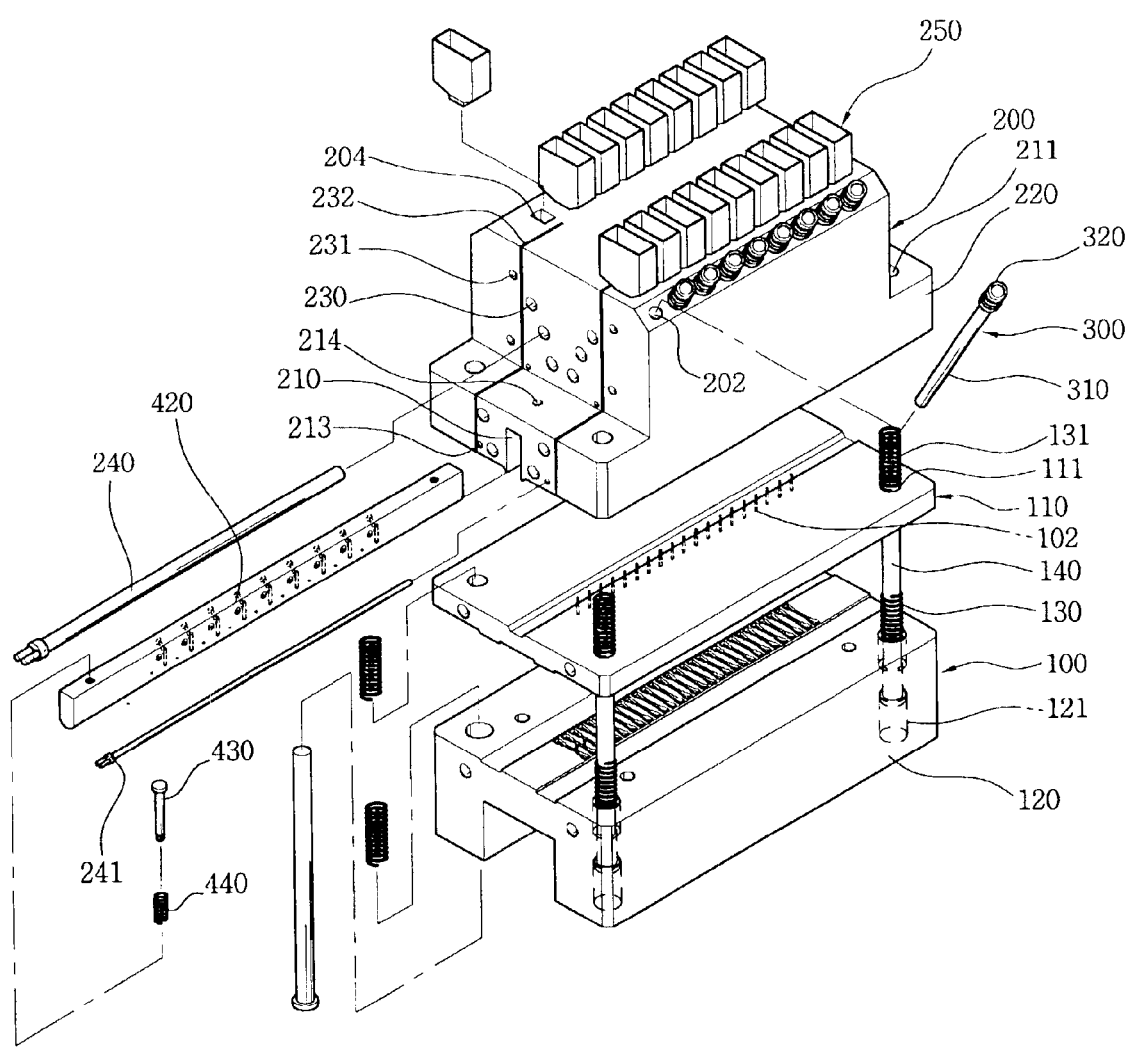
Figure 11:
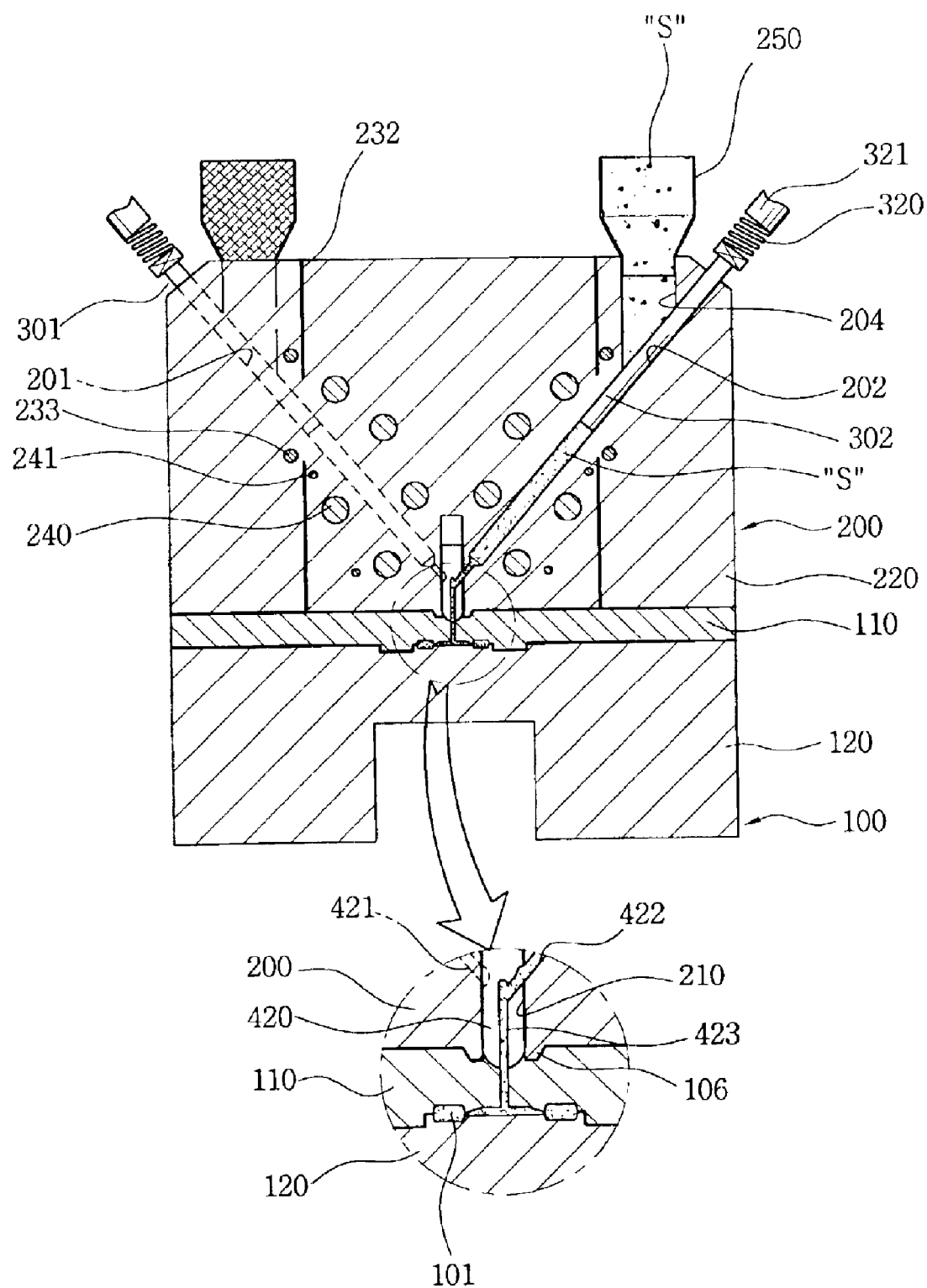
Figure 12:
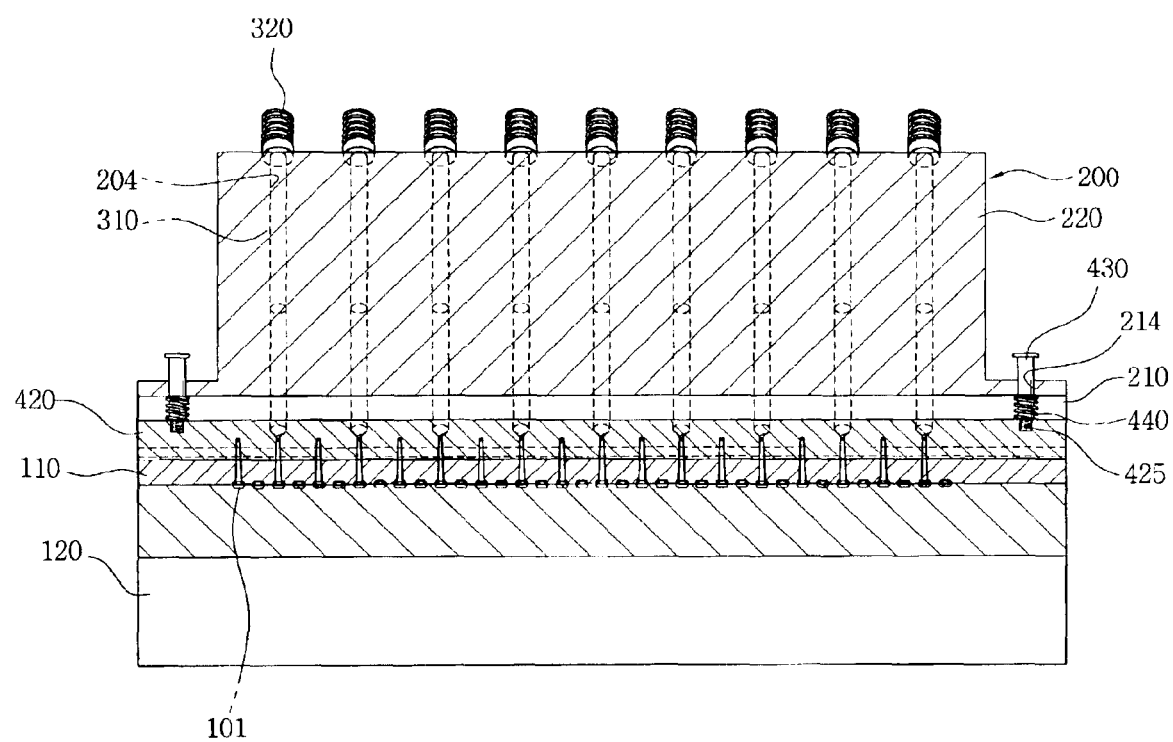
Figure 13:
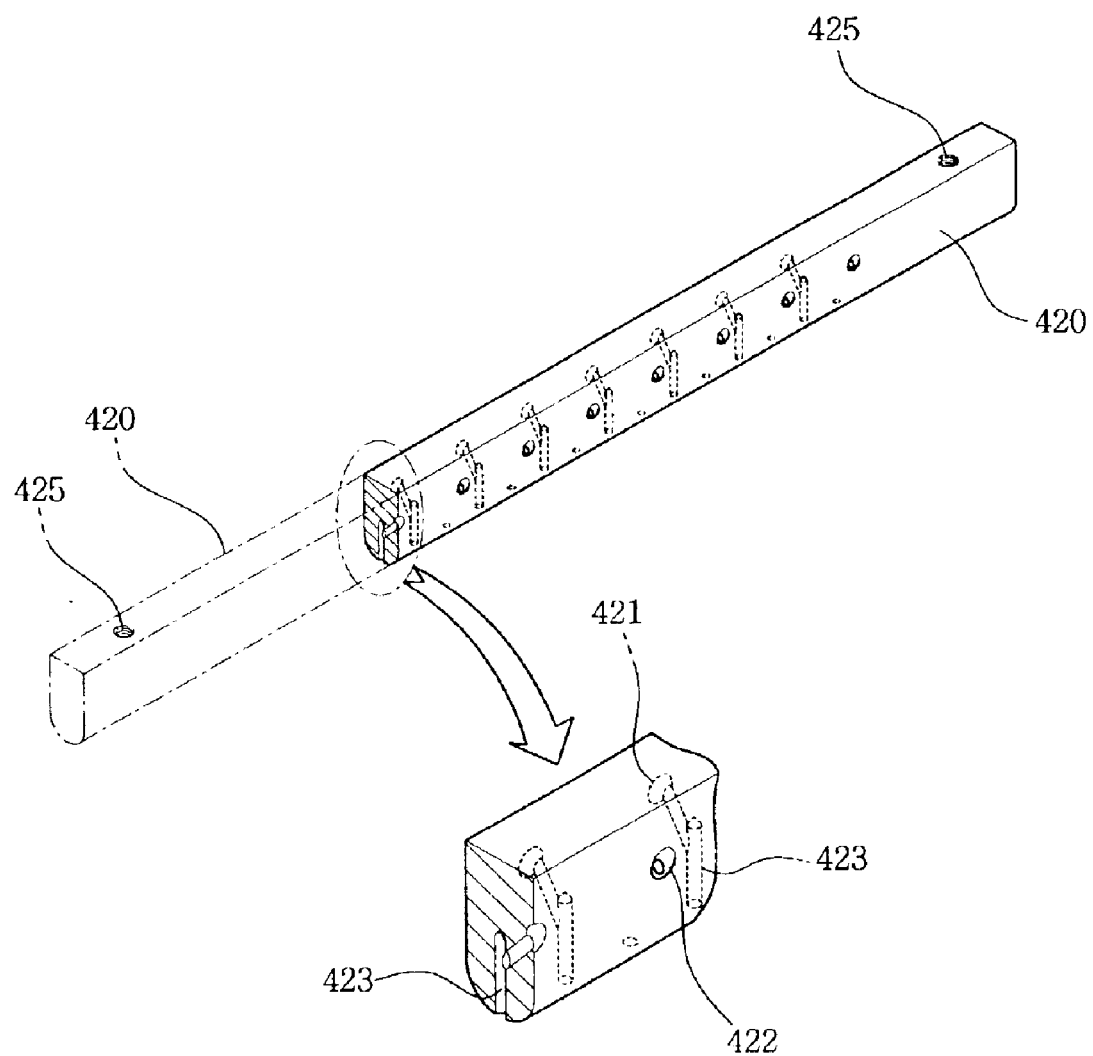

FIGS. 9 to 13 illustrate another embodiment of the multicolor slide fastener manufacturing apparatus according to the present invention. FIG. 9 is a perspective view of the multicolor slide fastener manufacturing apparatus. FIG. 10 is a partial exploded perspective view of the multicolor slide fastener manufacturing apparatus. FIG. 11 is a longitudinal sectional view showing the constitution of the multicolor slide fastener manufacturing apparatus viewed in the direction of the width. FIG. 12 is a longitudinal sectional view showing the constitution of the multicolor slide fastener manufacturing apparatus viewed in the lengthwise direction. FIG. 13 is a partially cutout perspective view of the integral valve unit.

As shown in these drawings, in this second embodiment of the multicolor slide fastener according to the present invention, the passage opening/closing means 400 includes: an actuation space part 210 formed within the cylinder block 220, and making the discharge holes 201a and 202a of the inclined passages 201 and 202 communicate to the nozzles 203;

an integral valve unit 420 having a plurality of lower discharge holes 423 and a plurality of both-side inlet holes 421 and 422 correspondingly to the nozzles 203 and the lower discharge holes 201a and 202a of the plurality of the inclined passages 201 and 202, for making the lower discharge hole 423 alternately communicate to the inlet hole 421 and the other inlet hole 422, the integral valve unit 420 being installed within the space part 210;

a pair of guide pins 430 inserted into a pair of fastening holes 425 at both ends of the integral valve unit 420, the pair of the guide pins 430 being slidably coupled into the guide holes 214 of the cylinder block 220 at its both ends; and a spring 440 installed at an intermediate portion of each of the guide pins 430, for elastically pressed down the integral valve unit 420, whereby the integral valve unit 420 is opened and closed in accordance with the rise and fall of the cylinder block 220.

The both-side inlet holes 421 and 422 of each valve of the valve unit 420 are arranged in a zigzag form alternately. Further, the inlet holes 421 and 422 of each valve of the integral valve unit 420 are alternately matched to the discharge hole 423, so that a single passage would be formed at a time.

In this second embodiment of the multicolor slide fastener-manufacturing apparatus according to the present invention, the operation is carried out in the following manner. That is, with the molding die 100 open as shown in FIG. 1, if the molding die 100 is closed like in FIGS. 11 and 12, then the integral valve unit 420 which has been inserted into the space part 210 of the cylinder block 220 is contacted to the upper die 110, with the result that the both-side inlet holes 411 and 412 communicate to the discharge holes 201a and 202a of the inclined passages 201 and 202.

Then the discharge holes 413 of the inclined passage 201 and 202 contact and communicate to the sprue holes 102 of the upper die 110. Therefore, each of the molding materials which have been contained within the inclined passages 201 and 202 passes through the discharge holes 201a or 202a of the inclined passage 201 or 202, the inlet holes 411 and 412 and the discharge hole 413 of each valve of the integral valve unit 420, the sprue hole 102 and the connecting slot 103 of the molding die 100 so as to be ultimately injected into the unit fastening teeth-forming slots 101 owing to the pressing force of the piston 310.

Other features of the constitution and action of the second embodiment are same as the first embodiment of the present invention.

In carrying out the present invention as described above, the unit fastening teeth-forming slots 101, the sprue holes 102, the connecting slots 103, the inclined passages 201 and 202 of the passage element 200, and the nozzles 203, which are formed in the molding die 100, can be varied as to their number and size. Further, it should be understood that other modifications and embodiments should belong to the present invention if they come within the scope of the present invention.

According to the present invention as described above, a plurality of unit fastening teeth are grouped into a plurality of sets, each set having different color. That is, the molding materials of different colors are injected through separate individual passages within a single molding die. Therefore, diversified patterns can be formed with one-shot type injection molding.

The injection molding can be carried out through the entire molding cavity and on the supporting tapes. This method can be practically applied to the actual production line to realize mass productions. Further, a high product quality and reliability can be maintained, while diversified patterns and colors can be expressed.

What is claimed is:

1. A method for manufacturing a multicolor slide fastener, comprising the steps of:
   loading a pair of supporting tapes 11 on a molding die 100, the molding die 100 having a plurality of mutually isolated unit fastening teeth-forming slots 101, and each of the molding materials S being injected into each of groups of the unit fastening teeth-forming slots 101 (supporting tape loading step);
   thermally melting and carrying the molding materials S of different colors from a raw material source part through inclined passages 201 and 202 of both sides, each of the inclined passages 201 and 202 being connected to each of injection passages of the molding die 100 (heating and melting step);
   opening/closing an opening/closing means 400, the opening/closing means being disposed between discharge ends of the inclined passages 201 and 202 and nozzles 203 (passage opening/closing step);
   injecting each of the molding materials of two or more colors through each of the nozzles 203 and injecting passages into each of groups of unit fastening teeth-forming slots 101 after melt-passing the molding materials through the passage-opening/closing means 400 (injecting step); and
   cooling unit fastening teeth 12 formed on the supporting tapes 11 and taking out completed product (cooling and taking-out step).

2. An apparatus for manufacturing a multicolor slide fastener by injecting molding materials into a molding die, comprising:
   the molding die 100 consisting of an upper die 110 and a lower die 120, a plurality of unit fastening teeth-forming slots 101 being formed on the molding die 100 in a lengthwise direction, a plurality of molding material-injecting passages being mutually isolatedly formed for respective groups of the unit fastening teeth-forming slots 101, and a plurality of sprue holes 102 being formed for injecting the molding materials S into the respective groups of the unit fastening teeth-forming slots 101;
   a plurality of inclined passages 201 and 202 connected to the molding material injecting passages respectively, for carrying the molding materials S from a raw material source part;
   a passage element 200 having a plurality of nozzles 203 connected to respective discharge holes 201a and 202a of the inclined passages 201 and 202 and to the injecting passages of the molding die 100;
   a plurality of heaters 240 and heat sensors 241 for heating the inclined passages 201 and 202 to melt the molding materials S to a proper temperature;
   a plurality of pressing means 300 such as pistons or carrying screws for press-carrying the molding materials S through the inclined passages 201 and 202; and
   an opening/closing means 400 installed between the lower discharge holes 201a and 202a and the nozzles 203, for opening/closing an injection of the molding materials S into the sprue holes 102 of the upper die 110.

3. The apparatus as claimed in claim 2, wherein the passage element 200 comprises:
   the cylinder block 220 disposed above the upper die 110, and containing a plurality of the nozzles 203 to be connected to the plurality of the sprue holes 102;
   a plurality of the inclined passages 201 and another plurality of the inclined passages 202 provided as many as the nozzles 203;
   a plurality of feeding holes 204 formed near upper ends of the inclined passages 201 and 202, for supplying the molding materials S; and
   the two pluralities of the inclined passages 201 and 202 forming a V shaped contour.

4. The apparatus as claimed in claim 2, wherein the passage element 200 comprises:
   the cylinder block 220 disposed above the upper die 110, and containing a plurality of the nozzles 203 to be connected to the plurality of the sprue holes 102;
   a plurality of the inclined passages 201 and another plurality of the inclined passages 202 provided as many as the nozzles 203;
   a plurality of feeding holes 204 formed near upper ends of the inclined passages 201 and 202, for supplying the molding materials S; and
   the two pluralities of the inclined passages 201 and 202 and the nozzles 203 forming a Y shaped contour.

5. The apparatus as claimed in anyone of claims 3 and 4, wherein the passage opening/closing means 400 comprises:
   an opening/closing rod insertion hole 205 for making the nozzles 203 and the inclined passages 201 and 202 communicate to each other within the cylinder block 220;
   an integral nozzle opening/closing rod 410 having a plurality of both-side inlet holes 411 and 412 and a plurality of lower discharge holes 413 correspondingly to the nozzles 203 and the discharge holes 201a and 202a of the inclined passages 201 and 202, for making the both-side inlet holes 411 and 412 alternately communicate to the discharge hole 413, the integral nozzle opening/closing rod 410 being inserted into the opening/closing rod insertion hole 205; and
   the integral nozzle opening/closing rod 410 being actuated by a known means.

6. The apparatus as claimed in anyone of claims 3 and 4, wherein the passage opening/closing means 400 comprises:
   an actuation space part 210 formed within the cylinder block 220, and making the discharge holes 201a and 202a of the inclined passages 201 and 202 communicate to the nozzles 203;
   an integral valve unit 420 having a plurality of lower discharge holes 423 and a plurality of both-side inlet holes 421 and 422 formed correspondingly to the nozzles 203 and the lower discharge holes 201a and 202a of the plurality of the inclined passages 201 and 202, for making the lower discharge hole 423 alternately communicate to the inlet hole 421 and the other inlet hole 422, the integral valve unit 420 being installed within the space part 210;
   a pair of guide pins 430 inserted into a pair of fastening holes 425 at both ends of the integral valve unit 420, the pair of the guide pins 430 being slidably coupled into the guide holes 214 of the cylinder block 220 at its both ends; and
   a spring 440 installed at an intermediate portion of each of the guide pins 430, for elastically pressed down the integral valve unit 420, whereby the integral valve unit 420 is opened and closed in accordance with the rise and fall of the cylinder block 220.

7. The apparatus as claimed in anyone of claims 3 and 4, wherein the two pluralities of the inclined passages 201 and 202 are arranged alternately one by one in a zigzag form.

8. The apparatus as claimed in anyone of claims 3 and 4, wherein the pressing means 300 consists of a piston 310 inserted into each of the inclined passages 201 and 202.

9. The apparatus as claimed in anyone of claims 3 and 4, wherein the pressing means 300 consists of a screw inserted into each of the inclined passages 201 and 202.

10. The apparatus as claimed in claim 5, wherein the integral nozzle opening/closing rod 410 is rotated clockwise or anticlockwise to make the molding materials S injected into the injection passages of the molding die 100.

11. The apparatus as claimed in claim 5, wherein the integral nozzle opening/closing rod 410 linearly moves back and forth to make the molding materials S injected into the injection passages of the molding die 100.

12. The apparatus as claimed in claim 5, wherein in the nozzle opening/closing rod 410, the both-side inlet holes 411 and 412 are arranged alternately in a zigzag form.

13. The apparatus as claimed in claim 6, wherein in the valve unit 420, the both-side inlet holes 421 and 422 are arranged alternately in a zigzag form.

14. The apparatus as claimed in claim 12, wherein in the nozzle opening/closing rod 410, each set of the both-side inlet holes 411 and 412 are matched to each of the discharge holes 413 so as to form a single path at a time.

15. The apparatus as claimed in claim 12, wherein in the valve unit 420, each set of the both-side inlet holes 411 and 412 are matched to each of the discharge holes 413 so as to form a single path at a time.

* * * * *